United States Patent
Sasaki

(10) Patent No.: US 7,257,058 B2
(45) Date of Patent: Aug. 14, 2007

(54) OFFSET ADJUSTING CIRCUIT FOR OPTICAL DISC AND OFFSET ADJUSTING METHOD

(75) Inventor: Hideaki Sasaki, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 553 days.

(21) Appl. No.: 10/850,789

(22) Filed: May 20, 2004

(65) Prior Publication Data

US 2004/0252599 A1    Dec. 16, 2004

(30) Foreign Application Priority Data

May 21, 2003    (JP)    ............................. 2003-144037

(51) Int. Cl.
*G11B 7/00*    (2006.01)

(52) U.S. Cl. ............................. 369/47.18; 369/47.25; 369/53.32

(58) Field of Classification Search ............... 369/47.1, 369/47.17, 47.35, 53.33, 124.14, 47.55, 44.32, 369/53.32, 47.25, 47.18
See application file for complete search history.

(56) References Cited

U.S. PATENT DOCUMENTS 6,992,954 B2 *    1/2006    Tsai et al. ................ 369/44.32
RE39,306 E *    9/2006    Konishi et al. .......... 369/47.17

FOREIGN PATENT DOCUMENTS

JP    10-105997    4/1998

* cited by examiner

*Primary Examiner*—Nabil Hindi
(74) *Attorney, Agent, or Firm*—SoCal IP Law Group LLP; Steven C. Sereboff; John E. Gunther

(57) ABSTRACT

An offset adjusting circuit for an optical disc comprises an offset-adjustment differential operational amplifier having an input terminal to which an output signal of an optical pickup is input and the other input terminal to which a control voltage is applied, an A/D converter that outputs a digital signal based on an output signal of the offset-adjustment differential operational amplifier, and a control voltage adjuster that varies the control voltage applied to the offset-adjustment differential operational amplifier based on the digital signal so as to remove an offset.

12 Claims, 5 Drawing Sheets

US 7,257,058 B2

OFFSET ADJUSTING CIRCUIT FOR OPTICAL DISC AND OFFSET ADJUSTING METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

RELATED APPLICATION INFORMATION

This application claims priority upon Japanese Patent Application No. 2003-144037 filed on May 21, 2003, which is herein incorporated by reference.

BACKGROUND OF THE INVENTION

1. Field of the Invention

The present invention relates to an offset adjusting circuit for an optical disc and an offset adjusting method.

2. Description of the Related Art

Generally, in an optical disc playback (and recording) apparatus (hereinafter referred to as an "optical disc apparatus"), after amplifying two output signals from an optical pickup, by a differential operational amplifier taking the difference between intensities of both the signals, a tracking error signal TE and a focus error signal FE for the optical disc are obtained. By controlling based on these error signals, a servo control system can make one spot of a light beam follow a track of the optical disc to irradiate precisely.

To date, the configuration of an error signal generating circuit for obtaining the tracking error signal TE and the focus error signal FE has included two chips: an IC chip (RF signal processing circuit) engaging in analog processing at the front stage and an IC chip (servo processing circuit) engaging in digital processing at the rear stage. That is, the analog processing system IC chip, after amplifying two output signals from the optical pickup, takes the difference between intensities of both the signals by a differential operational amplifier, and outputs the focus error signal and the tracking error signal to the digital processing system IC chip.

Then, the digital processing system IC chip converts the obtained focus error signal and tracking error signal into digital signals by an A/D converter and generates signals for adjusting offsets by an appropriate control logic in a digital signal processing section.

These offset adjusting signals are fed back to the analog processing system IC chip at the front stage so that the focus error signal and tracking error signal having the offset cancelled out are obtained (See, for example, Japanese Patent Application Laid-open Publication No. 10 105997 (FIG. 1)).

Specifically, as shown in FIG. 5, the optical disc apparatus irradiates an optical disc 105 with one spot of a light beam. First and second photo-detectors of an optical pickup receive reflected light from this optical disc 105. A servo signal processing circuit 140 cancels out the offsets to resolve the degradation of accuracy in focusing servo and tracking servo of the objective lens of the optical pickup 200.

A playback system PB of this optical disc apparatus will be explained. An RF signal processing circuit 110 supplies a combined signal having its offset cancelled out to a decoder 120. The decoder 120 performs processing such as de-interleave processing, decoding for error correction, EFM demodulation, and the like on the combined signal and supplies reproduced data to a memory 121.

The memory 121 is controlled in terms of write-in and read-out of data by a system controller (microcomputer) 150, and the reproduced data is written therein from the decoder 120. Also, the reproduced data is consecutively read out from the memory 121 at a constant bit rate. The reproduced data consecutively read out from the memory 121 is supplied to a decoder 122. When the reproduced data is compressed data, this decoder 122 decompresses the data to, for example, four times its size. Digital data from the decoder 122 is supplied to a D/A converter 123 to be converted into an analog signal, which is drawn to the outside through an output terminal 124. Then, as shown in, for example, FIG. 1 of the above-mentioned Japanese Patent Laid-open Publication, the offset adjuster of an RF signal processing circuit 2 at the front stage in a servo signal processing apparatus 1 adjusts the offset based on an offset adjustment amount calculated in a DSP (digital signal processor) of a servo processing circuit 90 at the rear stage.

Note that a recording system REC, as known well, is realized by constituents indicated by, for example, reference numerals 112 through 118 of FIG. 5.

In the above-mentioned related art, the offset is adjusted by calculating an offset adjustment amount on the servo processing circuit side at the rear stage. That is, the offset adjuster of the RF signal processing circuit 110 at the front stage does not take a measure against the offset on its own. Accordingly, if variations occur in the intensity of the reflected light because the specifications or the like of the optical pickup are different or the type of optical disc is different, the output signals from the optical pickup themselves cannot be accurately adjusted in terms of offsets. As a result, the error signals are generated based on the output signals whose offsets have not been accurately adjusted. Hence, at the stage where a differential operational amplifier takes the difference in intensity between two output signals of the optical pickup to generate an error signal, due to insufficient adjustment of the offset, the two output signals deviate from the dynamic range of a processing system including the differential operational amplifier, so that the waveforms thereof become distorted. Thus, an appropriate error signal cannot be generated, thereby causing the degradation of servo control based on the error signal.

SUMMARY OF THE INVENTION

An offset adjusting circuit for an optical disc according to the present invention comprises an offset-adjustment differential operational amplifier having an input terminal to which an output signal of an optical pickup is input and another input terminal to which a control voltage is applied; an A/D converter that outputs a digital signal based on an output signal of the offset-adjustment differential operational amplifier; and a control voltage adjuster that varies the control voltage applied to the offset-adjustment differential operational amplifier based on the digital signal so as to remove an offset.

Hence, by varying the control voltage of the offset-adjustment differential operational amplifier to which an output signal of the optical pickup is input, the offset of the output signal is adjusted. Thus, first, the offset of the output signal that originates from the optical pickup can be adjusted. In addition, the offset that originates from the offset-adjustment differential operational amplifier and the analog processing system can be adjusted together therewith. Therefore, the output signal of the offset-adjustment differential operational amplifier is a signal having the offset that originates from the upstream processing system including the optical pickup adjusted. As a result, also in the downstream processing system, which performs signal processing based on the output signal having the offset adjusted, such as a circuit generating error signals, e.g., the tracking error signal and the focus error signal, the output signal of the offset-adjustment differential operational amplifier can be made to fall within the dynamic range of the A/D converter and the like. Therefore, the dynamic range of each circuit that processes the signal having the offset adjusted can be effectively utilized.

Hence, the offset that originates from the upstream processing system including the optical pickup can be adjusted. As a result, accuracy degradation such as waveform distortion can be prevented in signal processing such as generating an error signal, and thereby a highly accurate error signal can be obtained. Thus, accuracy degradation in servo control based on the error signal can be prevented.

An offset adjusting method for an optical disc apparatus according to the present invention comprises the steps of outputting a digital signal based on an output signal of a offset-adjustment differential operational amplifier having an input terminal to which an output signal of an optical pickup is input and another input terminal to which a control voltage is applied, in the optical disc apparatus, and varying the control voltage applied to the offset-adjustment differential operational amplifier based on the digital signal so as to remove an offset.

Features and objects of the present invention other than the above will become clear by reading the description of the present specification with reference to the accompanying drawings.

DESCRIPTION OF THE DRAWINGS

For a more complete understanding of the present invention and the advantages thereof, reference is now made to the following description taken in conjunction with the accompanying drawings wherein:

FIG. 4A shows a case where a level of E or F signal does not equal to a target voltage, and FIG. 4B shows a case where the level of E or F signal equals to the target voltage.

DETAILED DESCRIPTION OF THE INVENTION

At least the following matters will be made clear by the explanation in the present specification and the description of the accompanying drawings.

====Entire Outline====

Figure 1:
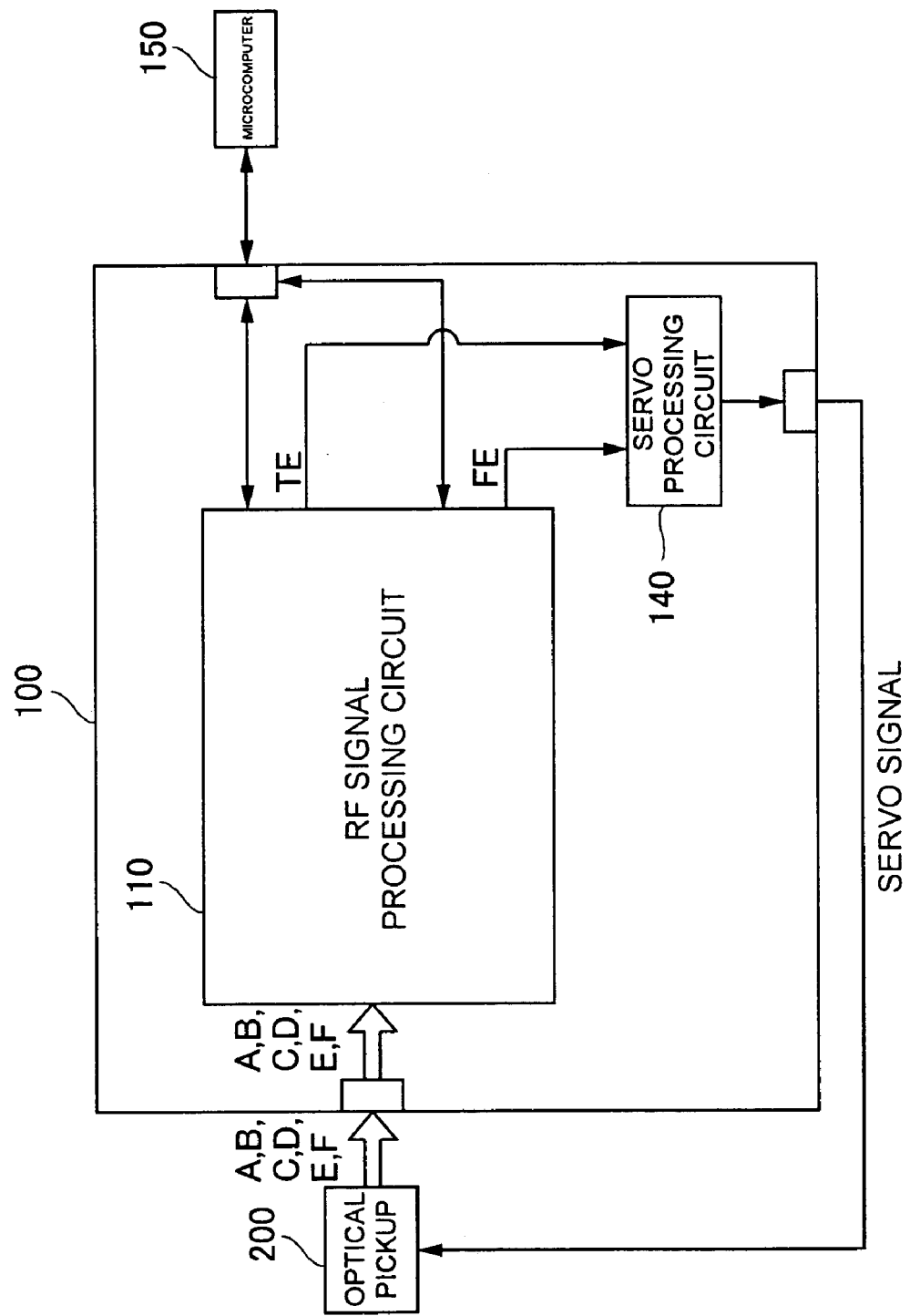
FIG. 1 is a block diagram showing the main part of an optical disc playback apparatus including an offset adjusting circuit for an optical disc according to the present invention.
Figure 5:
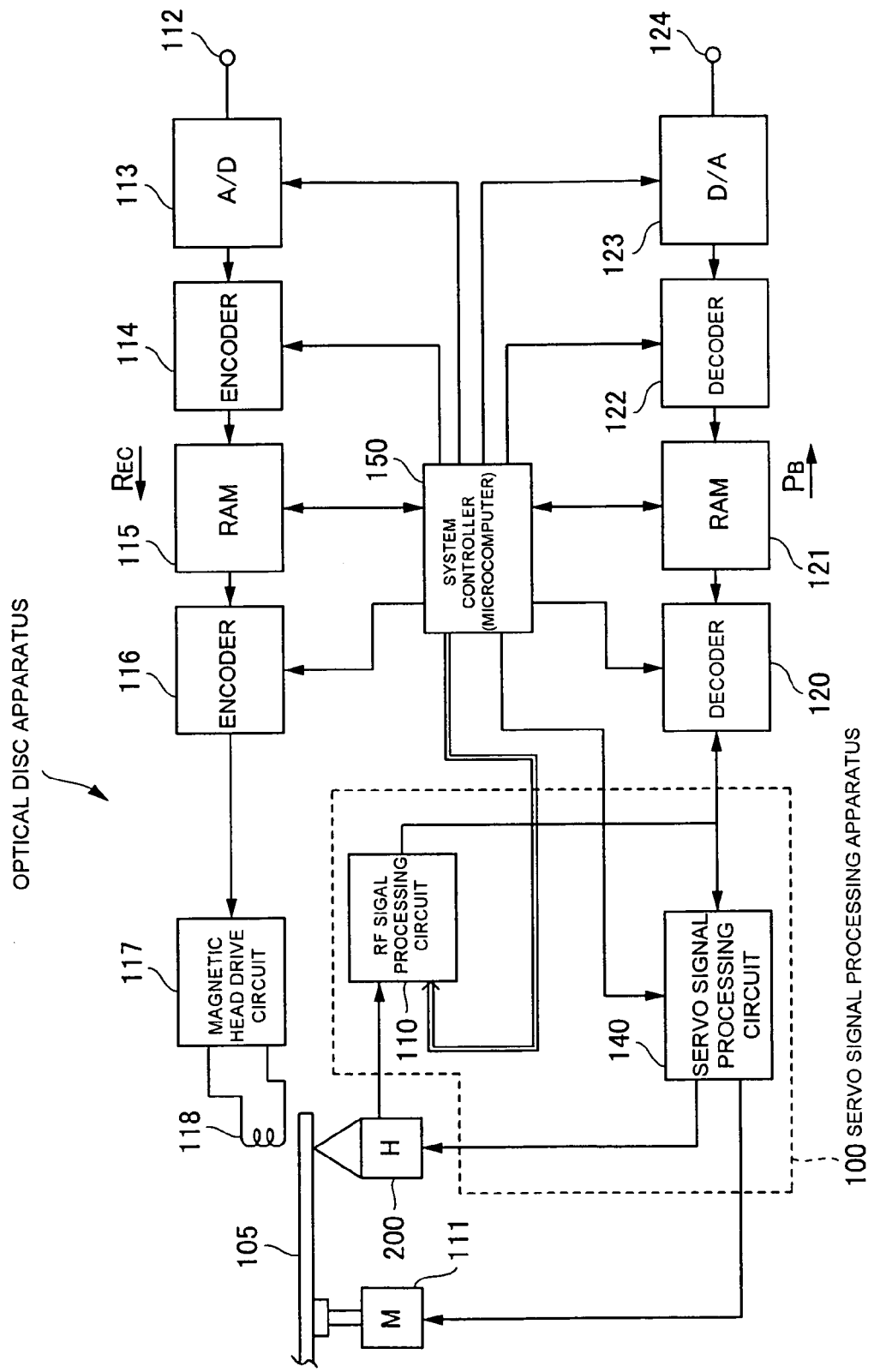
FIG. 5 is a block diagram of a conventional optical disc playback apparatus.

As shown in FIG. 1, an optical disc error signal generating circuit (servo signal processing apparatus) 100 is applied, for example, to the above-mentioned optical disc apparatus as shown in FIG. 5, and generates the tracking error signal TE and the focus error signal FE adjusted to remove or reduce DC offsets (direct current component offsets of the signals) based on a group of signals from the optical pickup 200. Note that the group of signals from the optical pickup 200 includes A to F signals as known well. This optical disc error signal generating circuit 100 is constituted by a one-chip-type integrated circuit. Alternatively, this integrated circuit can be produced with a CMOS process as a part of an optical disc playback signal processing LSI. The optical disc error signal generating circuit 100 comprises an RF signal processing circuit (offset adjusting circuit for an optical disc) 110 that generates error signals such as tracking error signal TE and focus error signal FE and a servo processing circuit 140.

The RF signal processing circuit 110, when generating the tracking error signal TE, operates so as to remove the DC offset thereof. This tracking error signal TE having the DC offset adjusted is supplied to the servo processing circuit 140. The servo processing circuit 140 generates servo signals based on the tracking error signal TE and the focus error signal FE and supplies them to the optical pickup 200.

====Embodiment====

<<<Configuration>>>

With regard to a circuit system generating the tracking error signal in the RF signal processing circuit 110, a scheme for removing or reducing the DC offset will be described. Note that the same, well-known circuit configuration as in the prior art can be adopted as a circuit generating the focus error signal FE. The configuration of the RF signal processing circuit described in, for example, above-mentioned Japanese Patent Application Laid-open Publication No. 10 105997 (particularly, FIG. 1 and a description in Paragraph No. 0028 and later) can be adopted.

Figure 2:
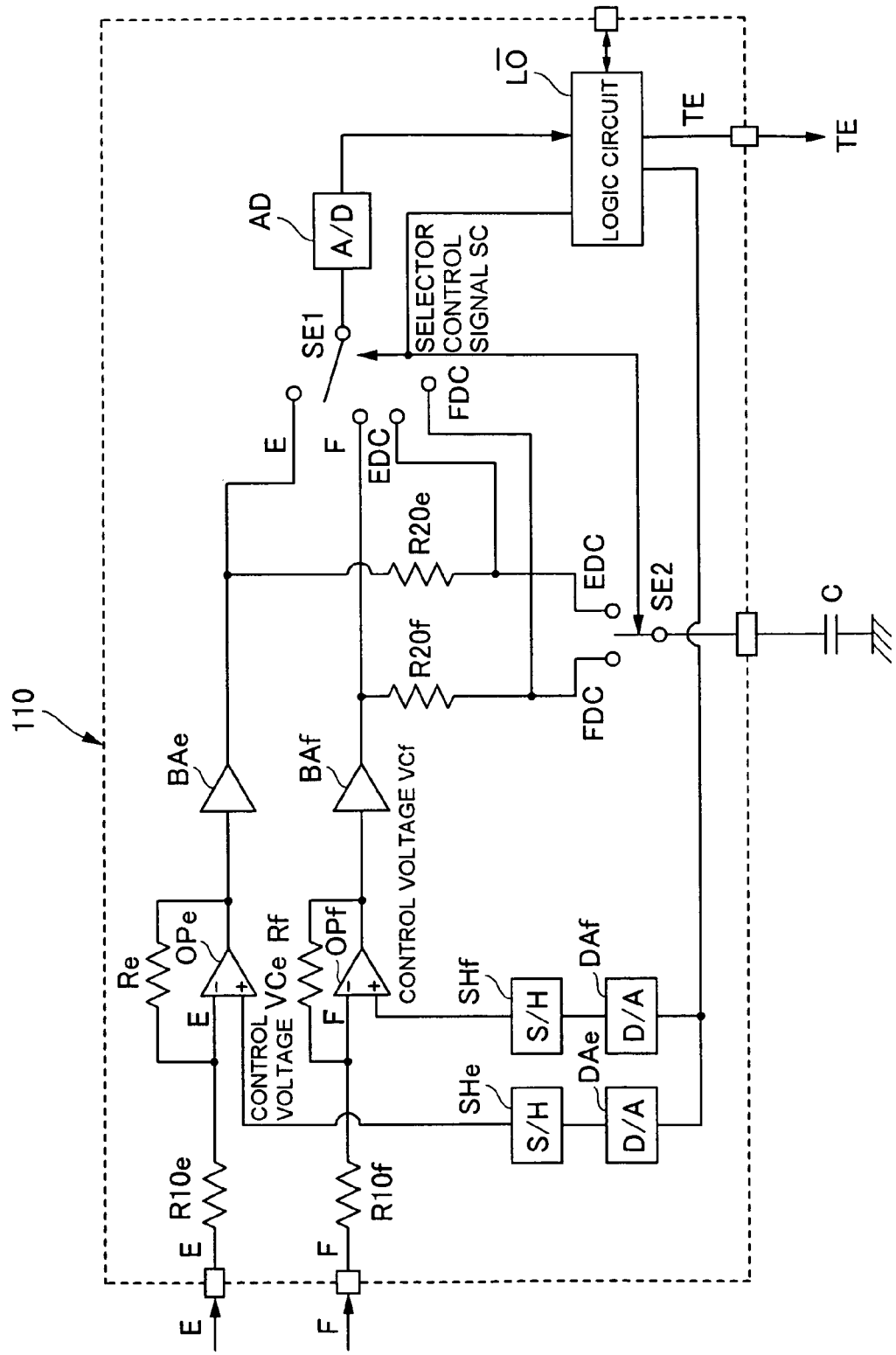
FIG. 2 is a block diagram showing the offset adjusting circuit for an optical disc according to the present invention.

As shown in FIG. 2, the RF signal processing circuit 110 comprises resistors R10e, R10f; offset-adjustment differential operational amplifiers (differential amplifiers) OPe, OPf; return resistors Re, Rf, buffer amplifiers BAe, BAf; resistors (part of a DC component output circuit) R20e, R20f; selectors SE1, SE2; an A/D converter AD; a logic circuit (control voltage adjuster) LO constituted by a microcomputer or the like; D/A converters DAe, DAf; and sample-and-hold circuits SHe, SHf. Furthermore, an external capacitor C (part of the DC component output circuit) is connected to the RF signal processing circuit 110.

One end of the resistor R10e is connected to an external input terminal E of the RF signal processing circuit 110, and output signal E obtained from the optical pickup is input thereto. The other end of this resistor R10e is connected to the inverting input terminal of the offset-adjustment differential operational amplifier OPe, and one end of the return resistor Re is connected to the output terminal of the offset-adjustment differential operational amplifier OPe. The other end of the return resistor Re is connected to the inverting input terminal of the offset-adjustment differential operational amplifier OPe. The output of the sample-and-hold circuit SHe is connected to the non-inverting input terminal of the offset-adjustment differential operational amplifier OPe. The output terminal of the offset-adjustment differential operational amplifier OPe is connected to the input terminal of the buffer amplifier BAe. The output terminal of the buffer amplifier BAe is connected to the E output signal select terminal of the selector SE1 and to one end of the resistor R20e. The other end of the resistor R20e is connected to the E signal DC component select terminal EDC of each selector SE1, SE2.

In contrast, one end of the resistor R10f is connected to an external input terminal F of the RF signal processing circuit 110, and output signal F obtained from the optical pickup is input thereto. The other end of this resistor R10f is connected to the inverting input terminal of the offset-adjustment differential operational amplifier OPf, and one end of the return resistor Rf is connected to the output terminal of the offset-adjustment differential operational amplifier OPf. The other end of the return resistor Rf is connected to the inverting input terminal of the offset-adjustment differential operational amplifier OPf. The output of the sample-and-hold circuit SHf is connected to the non-inverting input terminal of the offset-adjustment differential operational amplifier OPf. The output terminal of the offset-adjustment differential operational amplifier OPf is connected to the input terminal of the buffer amplifier BAf. The output terminal of the buffer amplifier BAf is connected to the F output signal select terminal of the selector SE1 and to one end of the resistor R20f. The other end of the resistor R20f is connected to the F signal DC component select terminal FDC of each selector SE1, SE2.

The selector SE1 is connected to the A/D converter AD, and the output terminal of this A/D converter AD is connected to the input terminal of the logic circuit LO. In contrast, the selector SE2 is connected to the external capacitor C. The output terminals of the logic circuit LO are connected respectively to the selectors SE1, SE2, the D/A converters DAe, DAf, and the external output terminal for outputting the tracking error signal TE.

The output terminal of the D/A converter DAe is connected to the input terminal of the sample-and-hold circuit SHe. In contrast, the output terminal of the D/A converter DAf is connected to the input terminal of the sample-and-hold circuit SHf.

<<<Common Operation>>>

A specific circuit operation will be explained. Output signal E obtained from the optical pickup 200 is input to the resistor R10e and output signal F obtained from the optical pickup is input to the resistor R10f. Note that these output signals E and F are, as known well, among the output signals obtained from the detector of the optical pickup 200 and described, for example, on page 218 of a literature "Illustrated Compact Disc Reader", Ohmsha, Ltd., Japan, Jun. 20, 2002, the First Impression of the Third Edition.

With regard to the offset-adjustment differential operational amplifier OPe, output signal E is applied to the inverting input terminal thereof through resistor R10e, and a control voltage VCe from the sample-and-hold circuit SHe is applied to the non-inverting input terminal. This offset-adjustment differential operational amplifier OPe outputs a signal to the buffer BAe, which signal is expressed by the arithmetic expression: (VCe−E)×Re/R10e.

Meanwhile, with regard to the offset-adjustment differential operational amplifier OPf, output signal F is applied to the inverting input terminal thereof through resistor R10f, and a control voltage VCf from the sample-and-hold circuit SHf is applied to the non-inverting input terminal. This offset-adjustment differential operational amplifier OPf outputs a signal to the buffer BAf, which signal is expressed by the operational expression: (VCf−F)×Rf/R10f.

<<<Offset Adjusting Operation>>>

According to instructions from the microcomputer 150, a control program for DC offset adjustment running on the logic circuit LO executes DC offset adjustment. First, when the offset adjustment operation process has started, the logic circuit LO sends a selector control signal SC to the selectors SE1, SE2 to form a circuit for offset adjustment operation. That is, when being to perform offset adjustment on E signal, as a connection state of the selectors SE1, SE2, the resistor R20e is connected between the input terminal of the A/D converter AD and the capacitor C. Alternatively, when being to perform offset adjustment on F signal, as a connection state of the selectors SE1, SE2, the resistor R20f is connected between the input terminal of the A/D converter AD and the capacitor C.

In this circuit configuration, a smoothing circuit (DC component output circuit) is constituted by a series circuit of the resistor R20e or R20f and the capacitor C. Thus, the DC component of the output signal of the offset-adjustment differential operational amplifier OPe, OPf, that is, the DC component of amplified E or F signal is detected and inputted to the A/D converter AD from the connection path between the resistor R20e or R20f and the capacitor C.

Figure 3:
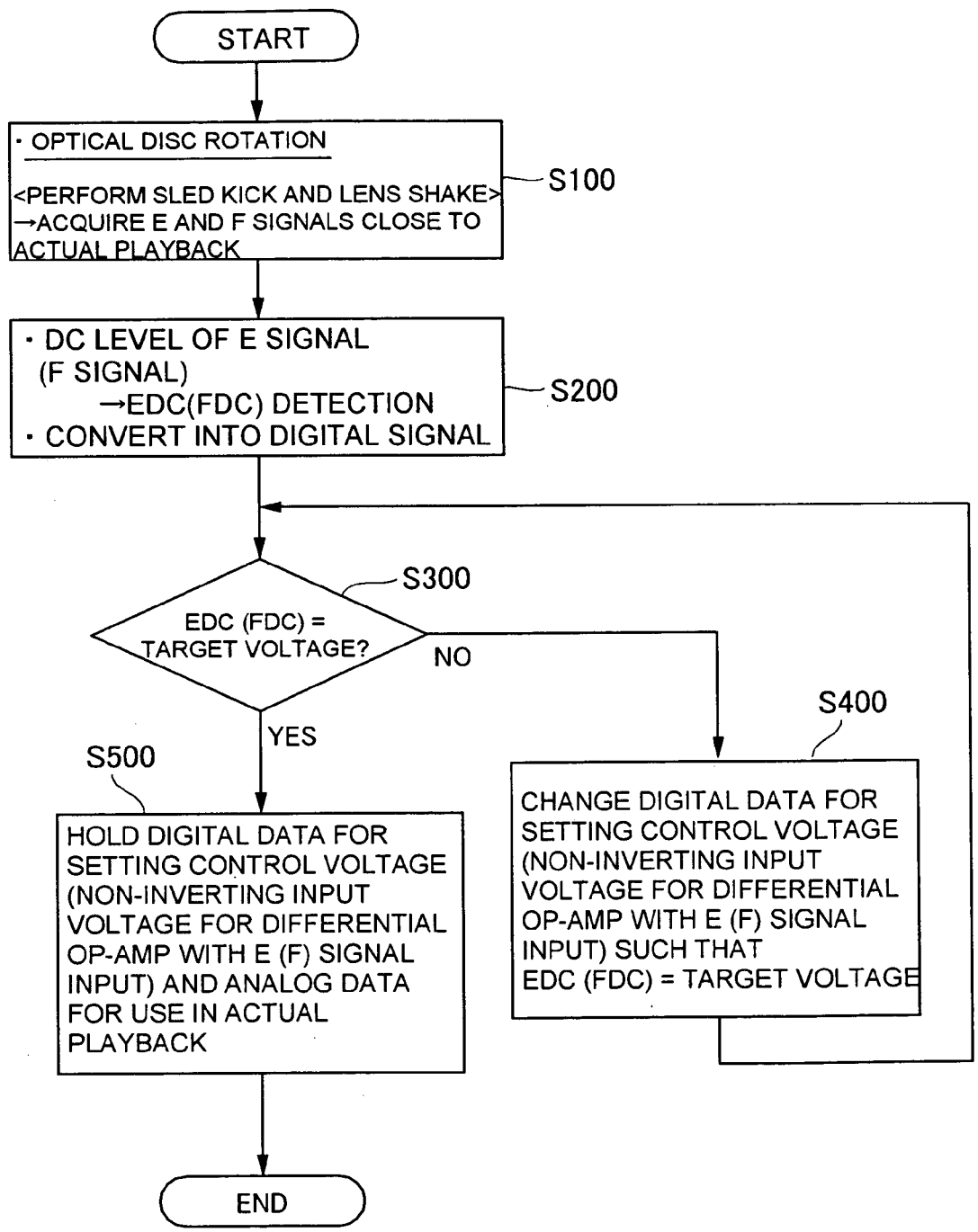
FIG. 3 is a flow chart showing an offset adjusting method according to the present invention.

Then, as shown in the flow chart of FIG. 3, according to instructions from the microcomputer 150, the servo processing circuit 140 rotates the optical disc (S100). At this time, operations such as so-called sled kick and lens shake, which make the optical pickup 200 move across in the radial direction of the optical disc, are performed. By this means, E and F signals that are close to those of the actual playback processing can be obtained.

Next, the offset processing of both E and F signals will be described together for convenience of description. The logic circuit LO obtains a digital signal of the DC component EDC of E signal (F signal) from the A/D converter AD (S200). Then, based on this digital signal, the logic circuit LO changes the control voltage VCe (VCf) applied to the offset-adjustment differential operational amplifier OPe (OPf) in order to remove the DC offset. That is, the logic circuit LO, based on the digital signal from the A/D converter AD, determines whether a level of the DC component EDC (FDC) of E signal (F signal) equals to a target voltage (S300). If not equal (S300: NO), digital data for setting the control voltage VCe (VCf) is changed such that the DC component EDC (FDC) becomes equal to the target voltage (S400). This digital data for setting the control voltage VCe (VCf) is converted by the D/A converter DAe (DAf) into an analog signal, which is held by the sample-and-hold circuit SHe (SHf) and supplied as the control voltage VCe (VCf) to the offset-adjustment differential operational amplifier OPe (OPf).

Such control logic is represented, for example, as a control table created beforehand, and stored in a memory of the logic circuit LO such that they can be referred to. Also, the level of the target voltage is about half (preferably, exactly half) a power supply voltage Vdd, which is supplied to circuits performing signal processing based on the output signal of the offset-adjustment differential operational amplifier OPe (OPf), and is stored beforehand in a memory of the logic circuit LO such that it can be referred to. That is, the output signal of the offset-adjustment differential operational amplifier OPe is adjusted to become about half the power supply voltage Vdd supplied to the circuits performing signal processing based on this output signal. As a result, the output signal of the offset-adjustment differential operational amplifier OPe (OPf) can be made to fall within the dynamic range of the circuits performing signal processing based on the output signal having the offset adjusted such as the A/D converter AD, the logic circuit LO and the like of a circuit generating the error signal TE described later.

Figure 4A:
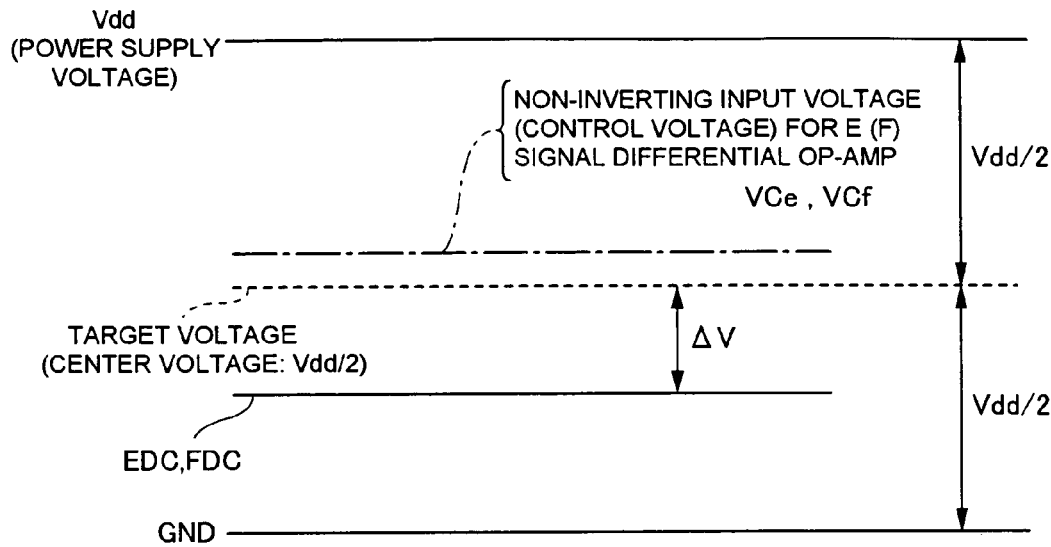
FIGS. 4A and 4B are graphs representing how to control according to the offset adjusting method of the present invention.

When a level of the DC component EDC of E signal, or FDC of F signal, does not equal to the target voltage, the DC component EDC, FDC (solid line) has a voltage difference of +ΔV relative to the target voltage (broken line) as shown in FIG. 4A, or a voltage difference of −ΔV, the opposite in polarity. In this case, E signal or F signal with the DC component EDC or FDC as its center, an analog waveform signal, is processed in each part of the circuitry, and thus the analog waveform does not fall within the range of from the power supply voltage (Vdd) to the ground voltage (the dynamic range), so that the analog waveform is distorted with the upper or lower end thereof cut away.

Figure 4B:
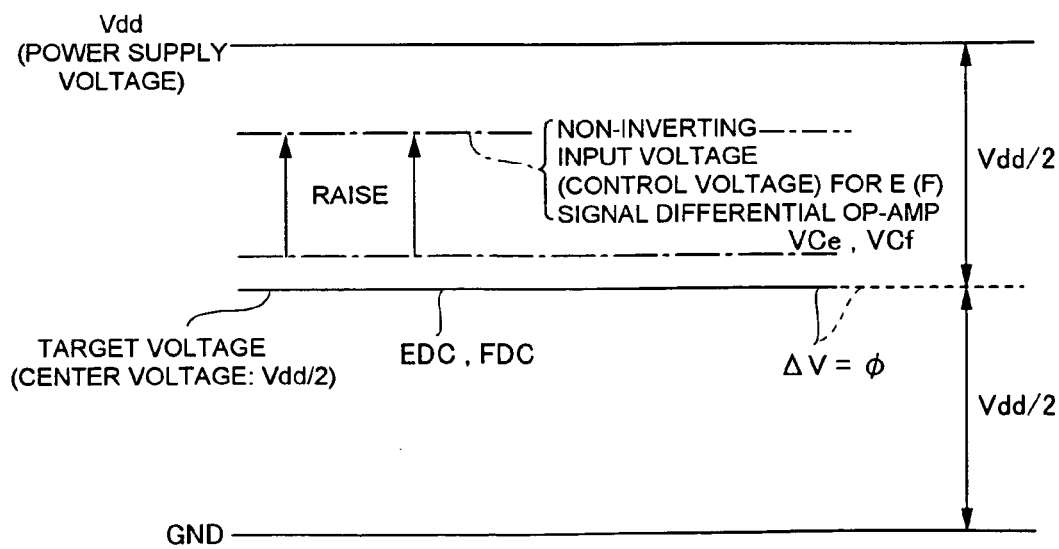

However, the above-mentioned offset adjustment raises the control voltage VCe, VCf as shown in FIG. 4B (or lowers the same in the case of the opposite in polarity −ΔV), so that a level of the DC component EDC of E signal, or FDC of F signal, equals to the target voltage (ΔV=zero). Thus, the analog waveform falls within the range of from the power supply voltage (Vdd) to the ground voltage (the dynamic range), so that the dynamic range is used effectively and thereby the waveform is prevented from being distorted.

Note that the level of the target voltage is not limited to about half the power supply voltage Vdd, but need only be set at such a value as enables the output signal of the offset-adjustment differential operational amplifier OPe (OPf) to fall within the dynamic range of the circuits performing signal processing based on the output signal.

After the above process of S400, the process returns to the above-mentioned process of S300, and when the digital value EDC equals to the target voltage (or digital data equivalent thereto) (S300: YES), considering that the DC offset adjustment is complete, the digital data EDC or FDC equal thereto is held by the sample-and-hold circuit SHe, SHf (S500) and used as a setting value for actual optical disc playback processing.

Note that although the offset adjustment of S200 through S500 above has been explained for both E and F signals together for convenience of description, the offset adjustment processing is, in practice, performed individually and sequentially for them.

<<<Operation of Generating Error Signal in Actual Playback>>>

After the above DC offset adjustment is complete, immediately, the actual playback operation of the optical disc starts. As shown in FIG. 2, the logic circuit LO has not only the DC offset adjustment function but also a function of generating the tracking error signal TE and supplying to the servo processing circuit 140 of FIG. 1.

By this means, a subtracting (E−F) circuit for generating the tracking error signal TE becomes unnecessary, thereby reducing size, power consumption, and cost. That is, the logic circuit LO can switch to playback processing only by switching connection states of the selectors SE1, SE2. Therefore, the RF signal processing circuit 110 as a whole does not need a circuit section exclusively for playback processing, thus reducing size, power consumption, and cost.

Note that used as the values of the control voltages VCe, VCf for this playback are the setting values that are sampled and held by the sample-and-hold circuits SHe, SHf when the DC offset adjustment finishes as mentioned above.

Specifically, when acquiring E signal, the logic circuit LO changes the connection state of the selector SE1 such that the buffer amplifier BAe is connected to the A/D converter AD. As a result, the logic circuit LO acquires digital data of amplified E signal and stores it in its own memory. Then, immediately the logic circuit LO changes the connection state of the selector SE1 to connect the buffer amplifier BAf to the A/D converter AD, acquires digital data of amplified F signal, and stores it in its own memory. Then, the logic circuit LO reads out digital data of both E and F signals, and performs subtraction to generate the tracking error signal TE.

As described above, only by switching connection states of the selector SE1, digital data of both E and F signals can be acquired to generate the tracking error signal TE. Thus, the one common A/D converter AD is shared without need for providing an A/D converter AD individually for each of E and F signals. Consequently, the size, power consumption, and cost can be reduced.

===Another Embodiment===

Although, for example, the D/A converters DAe, DAf are provided respectively for E and F signals, one common D/A converter may be shared. Specifically, a switch identical in configuration to the selector SE2 is provided between this common D/A converter and the two sample-and-hold circuits SHe, SHf. And when performing offset processing for E signal and for F signal individually, the switch is switched as needed, to connect the common D/A converter to the relevant sample-and-hold circuit SHe, SHf.

Moreover, in the block diagram of FIG. 2, an A/D converter AD may be provided individually for each of E and F signals. By this means, the logic circuit LO can acquire digital data of both the signals simultaneously without the process of acquiring digital data of E and F signals sequentially by switching connection states of the selector SE1. Thus, the process of generating the tracking error signal TE can be accelerated.

Also, the present invention can be applied to so-called A to D signals other than E and F signals in terms of objects to be adjusted in DC offset. In addition, the present invention can be applied to not only generating the tracking error signal but also to other signal processing such as generating the focus error signal.

Although the present invention has been described above specifically based on the embodiments thereof, not being limited to these, various changes can be made thereto without departing from the scope of the invention.

According to the present embodiment, the following actions and effects are produced.

By varying the control voltage of the offset-adjustment differential operational amplifier to which an output signal of the optical pickup is input, the offset of the output signal is adjusted. Thus, first, the offset of the output signal that originates from the optical pickup can be adjusted. In addition, the offset that originates from the offset-adjustment differential operational amplifier and the analog processing system can be adjusted together therewith. Therefore, the output signal of the offset-adjustment differential operational amplifier is a signal having the offset that originates from the upstream processing system including the optical pickup adjusted. As a result, also in the downstream processing system, which performs signal processing based on the output signal having the offset adjusted, such as the circuit generating error signals, e.g., the tracking error signal and the focus error signal, the output signal of the offset-adjustment differential operational amplifier can be made to fall within the dynamic range of the A/D converter and the like. Therefore, the dynamic range of each circuit that processes the signal having the offset adjusted can be effectively utilized.

Hence, the offset that originates from the upstream processing system including the optical pickup can be adjusted. As a result, accuracy degradation such as waveform distortion can be prevented in signal processing such as generating an error signal, and thereby a highly accurate error signal can be obtained. Thus, accuracy degradation in servo control based on the error signal can be prevented.

In addition, the output signals of the offset-adjustment differential operational amplifiers can be made to fall within the dynamic range of the A/D converter and the like. Thus, a high resolution A/D converter is not necessary, and thereby lower cost and lower power consumption can be achieved.

Furthermore, because the offset of the output signal that originates from the optical pickup can be adjusted, offset adjustment can be appropriately performed even when optical pickups of various specifications in terms of output signal intensity and the like are connected to the offset adjusting circuit for optical discs. Moreover, for various types of optical discs different in the intensity of reflected light, offset adjustment can be appropriately performed because the offset of the output signal that originates from the optical pickup can be adjusted.

Yet further, in implementing the offset adjusting circuit, the downstream processing system that performs signal processing based on the output signal having the offset adjusted such as the circuit generating an error signal does not need to be changed in design but is used as it is.

The output signal of the offset-adjustment differential operational amplifier can be made to fall within the dynamic range of the circuits that perform signal processing based on this output signal such as the A/D converter and the like of the circuit generating an error signal. Hence, highly accurate offset adjustment becomes possible, and thus, accuracy degradation such as waveform distortion can be prevented in signal processing such as generating an error signal, and thereby a highly accurate error signal can be obtained. Thus accuracy degradation in servo control based on the error signal can be prevented.

Still further, in order to eliminate the offset, the control voltage applied to the offset-adjustment differential operational amplifier can be varied based on the digital signal corresponding to the DC component of the output signal of the offset-adjustment differential operational amplifier. That is, by adjusting the offset based on the DC component of the output signal, the output signal of the offset-adjustment differential operational amplifier can be made to certainly fall within the dynamic range of the circuits that perform signal processing based on the output signal having its offset adjusted such as the A/D converter and the like of the circuit generating an error signal. Hence, highly accurate offset adjustment becomes possible when generating the error signal, and thereby a highly accurate error signal can be obtained. Thus, accuracy degradation in servo control based on the error signal can be prevented.

Furthermore, the control voltage adjuster not only adjusts the offset but also generates the error signal for servo control of the optical pickup. By this means, a circuit exclusively for generating the error signal becomes unnecessary, and thus size, power consumption, and cost can be reduced.

Yet further, when, by having selectively switched the selector, the output signal from the offset-adjustment differential operational amplifier is input into the A/D converter, the control voltage adjuster can generate the error signal based on the digital signal from the A/D converter. In contrast, when, by having selectively switched the selector, the DC component from the DC component output circuit is input into the A/D converter, the control voltage adjuster can adjust the offset based on the digital signal from the A/D converter. Therefore, a single common A/D converter need only be provided without need for providing an A/D converter individually each for generating the error signal and the offset adjusting process. Thus, size, power consumption, and cost can be reduced.

The dynamic range of each circuit that processes the signal having the offset adjusted can be effectively utilized.

Although the preferred embodiment of the present invention has been described in detail, it should be understood that various changes, substitutions and alterations can be made therein without departing from the spirit and scope of the invention as defined by the appended claims.

It is claimed:

1. An offset adjusting circuit for an optical disc, comprising:
    an offset-adjustment differential operational amplifier having an input terminal to which an output signal of an optical pickup is input and another input terminal to which a control voltage is applied;
    a direct current component output circuit that outputs a direct current component of an output signal of the offset-adjustment differential operational amplifier;
    an A/D convener that outputs a digital signal based on the direct current component; and
    a control voltage adjuster that varies the control voltage applied to the offset-adjustment differential operational amplifier based on the digital signal so as to remove an offset.

2. The offset adjusting circuit for an optical disc according to claim 1, wherein the control voltage adjuster varies the control voltage such that a level of the output signal of the offset-adjustment differential operational amplifier becomes equal to a target voltage.

3. The offset adjusting circuit for an optical disc according to claim 2, wherein the target voltage has such a value as to enable the output signal of the offset-adjustment differential operational amplifier to fall within a dynamic range of a circuit performing signal processing based on the output signal.

4. The offset adjusting circuit for an optical disc according to claim 1, wherein the optical pickup outputs a plurality of the output signals, and the offset-adjustment differential operational amplifier is provided for each of the output signals.

5. The offset adjusting circuit for an optical disc according to claim 4, further comprising:
    a single common D/A converter that converts the control voltages applied to the respective offset-adjustment differential operational amplifier for the respective output signals of the optical pickup from the control voltage adjuster into respective analog signals;
    a plurality of sample-and-hold circuits, each of the sample-and-hold circuits provided for each of the output signals that samples and holds one of the analog signals relevant to the each of the output signals outputted from the D/A converter to supply the sampled and held analog signal to the respective offset-adjustment differential operational amplifier; and a selector that selects one of the sample-and-hold circuits according to the analog signal from the D/A converter and supplies the analog signal to the selected sample-and-hold circuit.

6. The offset adjusting circuit for an optical disc according to claim 1, wherein the control voltage adjuster generates an error signal for servo control of the optical pickup based on the digital signal from the A/D converter.

7. The offset adjusting circuit for an optical disc according to claim 1, further comprising:
a selector that selectively supplies either of the output signal of the offset-adjustment differential operational amplifier or the direct current component from the direct current component output circuit to the A/D converter.

8. An offset adjusting method for an optical disc apparatus, comprising the steps of:
outputting a direct current component of an output signal of an offset-adjustment differential operational amplifier having an input terminal to which an output signal of an optical pickup is input and another input terminal to which a control voltage is applied, in the optical disc apparatus;
outputting a digital signal based on the direct current component; and
varying the control voltage applied to the offset-adjustment differential operational amplifier based on the digital signal so as to remove an offset.

9. An offset adjusting circuit for an optical disc, comprising:
a plurality of offset-adjustment differential operational amplifiers corresponding to a plurality of optical pickup output signals output from an optical pickup, each offset-adjustment differential operational amplifier having an input terminal to which the respective optical pickup output signal is input and another input terminal to which a respective control voltage is applied;
a plurality of sample-and-hold circuits corresponding to the plurality of offset-adjustment differential operational amplifiers, each of the sample-and-hold circuits providing the respective control voltage to the corresponding offset-adjustment differential operational amplifiers;
an A/D converter that outputs digital signals based on output signals of the plurality of offset-adjustment differential operational amplifiers;
a control voltage adjuster that varies the control voltages applied to the plurality of offset-adjustment differential operational amplifiers based on the digital signals;
a single common D/A converter that converts the control voltages applied to the plurality of offset-adjustment differential operational amplifiers from the control voltage adjuster into respective analog signals; and
a first selector that selects one of the plurality of sample-and-hold circuits according to the analog signal from the D/A converter and supplies the analog signal to the selected sample-and-hold circuit.

10. The offset adjusting circuit of claim 9, further comprising:
a second selector that selects an output from one of the plurality of offset-adjustment differential operational amplifiers to be converted by the A/D converter.

11. The offset adjusting circuit of claim 9, further comprising:
at least one direct current component output circuit that outputs a direct current component of the output signal of one of the plurality of offset-adjustment differential operational amplifiers.

12. The offset adjusting circuit of claim 11, further comprising:
a second selector that selects either an output from one of the plurality of offset-adjustment differential operational amplifiers or the direct current component to be converted by the A/D converter.

* * * * *

UNITED STATES PATENT AND TRADEMARK OFFICE
CERTIFICATE OF CORRECTION

PATENT NO. : 7,257,058 B2 Page 1 of 1
APPLICATION NO. : 10/850789
DATED : August 14, 2007
INVENTOR(S) : Sasaki It is certified that error appears in the above-identified patent and that said Letters Patent is hereby corrected as shown below:

Column 10 line 31, replace "convener" with --converter--

Signed and Sealed this

Sixth Day of November, 2007

JON W. DUDAS
*Director of the United States Patent and Trademark Office*